US012602093B2

(12) United States Patent
Wang et al.

(10) Patent No.: US 12,602,093 B2
(45) Date of Patent: Apr. 14, 2026

(54) LAPTOP COMPUTER

(71) Applicant: Acer Incorporated, New Taipei (TW)

(72) Inventors: Yu-Shih Wang, New Taipei (TW);
Wen-Chieh Tai, New Taipei (TW);
Chih-Chun Liu, New Taipei (TW);
Dong-Sheng Wu, New Taipei (TW);
Tzu-Wei Lin, New Taipei (TW);
Yi-Mu Chang, New Taipei (TW)

(73) Assignee: Acer Incorporated, New Taipei City
(TW)

( * ) Notice: Subject to any disclaimer, the term of this
patent is extended or adjusted under 35
U.S.C. 154(b) by 215 days.

(21) Appl. No.: 18/621,050

(22) Filed: Mar. 28, 2024

(65) Prior Publication Data

US 2025/0138593 A1     May 1, 2025

(30) Foreign Application Priority Data

Oct. 27, 2023    (TW) ................................. 112141304

(51) Int. Cl.
G06F 1/16          (2006.01)
G06F 1/18          (2006.01)
G06F 1/184          (2026.01)

(52) U.S. Cl.
CPC .......... G06F 1/1683 (2013.01); G06F 1/1616
(2013.01); G06F 1/1681 (2013.01); G06F
1/184 (2013.01)

(58) Field of Classification Search
CPC .... G06F 1/1616; G06F 1/1654; G06F 1/1681;
G06F 1/1683; G06F 1/184
See application file for complete search history.

(56) References Cited

U.S. PATENT DOCUMENTS

| | | | | | |
|---|---|---|---|---|---|
| 5,168,429 | A | * | 12/1992 | Hosoi | G06F 1/1654 |
| | | | | | 439/165 |
| 5,237,488 | A | * | 8/1993 | Moser | H01R 35/04 |
| | | | | | 439/31 |
| 5,897,382 | A | * | 4/1999 | Takahashi | H01R 35/04 |
| | | | | | 439/31 |
| 6,195,254 | B1 | * | 2/2001 | Chang | G06F 1/1616 |
| | | | | | 345/905 |
| 6,310,768 | B1 | * | 10/2001 | Kung | G06F 1/1616 |
| | | | | | 345/905 |
| 6,447,314 | B1 | * | 9/2002 | Kato | G06F 1/1681 |
| | | | | | 439/31 |
| 7,001,193 | B2 | * | 2/2006 | Zaderej | H01R 39/64 |
| | | | | | 439/165 |

(Continued)

FOREIGN PATENT DOCUMENTS

| | | |
|---|---|---|
| CN | 1866157 | 11/2006 |
| CN | 201029194 Y * | 2/2008 |
| TW | I774518 | 8/2022 |

*Primary Examiner* — Nidhi Thaker
(74) *Attorney, Agent, or Firm* — JCIPRNET

(57)          ABSTRACT

A laptop computer including a first body, a circuit board
disposed in the first body, a second body, a display module
disposed in the second body, a hinge connected to the first
and the second bodies, and a mezzanine connector is pro-
vided. The first and the second bodies are pivoted to each
other to be folded or unfolded via the hinge. The mezzanine
connector is clamped between the hinge and the circuit
board, and is electrically connected between the display
module and the circuit board.

9 Claims, 9 Drawing Sheets

(56)               References Cited

U.S. PATENT DOCUMENTS

| | | | | |
|---|---|---|---|---|
| 8,896,998 | B2 * | 11/2014 | Moser | G06F 1/1654 |
| | | | | 345/173 |
| 9,105,992 | B2 * | 8/2015 | Wang | H01R 39/64 |
| 10,788,865 | B1 * | 9/2020 | Files | G06F 1/26 |
| 2011/0199319 | A1 * | 8/2011 | Moser | G06F 1/1616 |
| | | | | 73/488 |
| 2011/0199726 | A1 * | 8/2011 | Moser | G06F 1/1616 |
| | | | | 375/259 |

* cited by examiner

120

130

140

140

110

100

Z

X

Y

LAPTOP COMPUTER

CROSS-REFERENCE TO RELATED APPLICATION

This application claims the priority benefit of Taiwan application serial no. 112141304, filed on Oct. 27, 2023. The entirety of the above-mentioned patent application is hereby incorporated by reference herein and made a part of this specification.

BACKGROUND

Technical Field

The disclosure relates to a laptop computer.

Description of Related Art

ESG is the abbreviation of three English words, namely Environment, Social and Governance. The United Nations Global Compact first proposed the concept of ESG in 2004, and it is regarded as an indicator for evaluating a company's operations. ESG is a measure of a company's sustainable development indicators, which are the carbon reduction and sustainable development goals required by international and domestic governments. In the past, business operations only required attention to financial data. However, despite having good financial reports, if operations violate human rights and discharge wastewater, it will infringe on consumers' rights and harm the living environment of the earth's creatures. At the same time, it will also violate the international goal of promoting earth sustainability, prompt institutional investors to reduce investment and cooperation in such companies, and even affect the company's reputation. Today, companies that value the ESG concept not only have transparent financial reports, but also have stable and low-risk operating models, and their long-term performance will be relatively stable. Therefore, for the electronics manufacturing industry, whether the products it manufactures can meet the above conditions has become one of the evaluation conditions for the product.

Taking a laptop computer as an example, whether it meets the above conditions depends on the energy consumed in the manufacturing process of the product and whether the product has the ability to be repaired (renewed). In order to achieve the above goals, the component design and assembly configuration of the laptop computers require corresponding new technologies and measures.

To put it simply, in terms of assembly and configuration, when the existing assembly process of the laptop computers is used for electronic components with wires or cables, it often requires not only structural assembly, but also wire management, plugging, and other actions. In addition to the complicated process, the above-mentioned actions may also easily lead to errors due to the large number of wirings, causing considerable inconvenience and thus reducing the regeneration (repairability) capability of the laptop computer.

SUMMARY

The invention provides a laptop computer, which not only has good heat dissipation efficiency, but also is convenient for users to operate.

A laptop computer of the present invention includes a first body, a circuit board disposed in the first body, a second body, a display module disposed in the second body, a hinge connected to the first and the second bodies, and a mezzanine connector. The first and the second bodies are pivoted to each other to be folded or unfolded via the hinge. The mezzanine connector is clamped between the hinge and the circuit board, and is electrically connected between the display module and the circuit board.

Based on the above, the laptop computer uses the corresponding settings of the hinge, the mezzanine connector and the circuit board in the body, so that when the display module and the hinge are assembled into the body with the circuit board built in, the mezzanine connector is clamped between the hinge and the circuit board. More importantly, the display module can be electrically connected to the circuit board through the mezzanine connector. In this way, the electrical connection can also be completed during the assembly of the aforementioned structure. For assembly operators, it can effectively simplify the assembly process and avoid the need to first arrange the wiring of electronic components (such as display modules) before plugging them in, thereby avoiding the occurrence of plugging errors.

Furthermore, the matching relationship between the above-mentioned components is beneficial to the disassembly and assembly operations. Therefore, for the laptop computer, users can easily complete subsequent expansion or repair without being limited by complicated assembly relationships, thereby improving the regeneration (repairability) ability of the laptop computer and meeting the conditions of sustainability.

DESCRIPTION OF THE EMBODIMENTS

Figure 1:
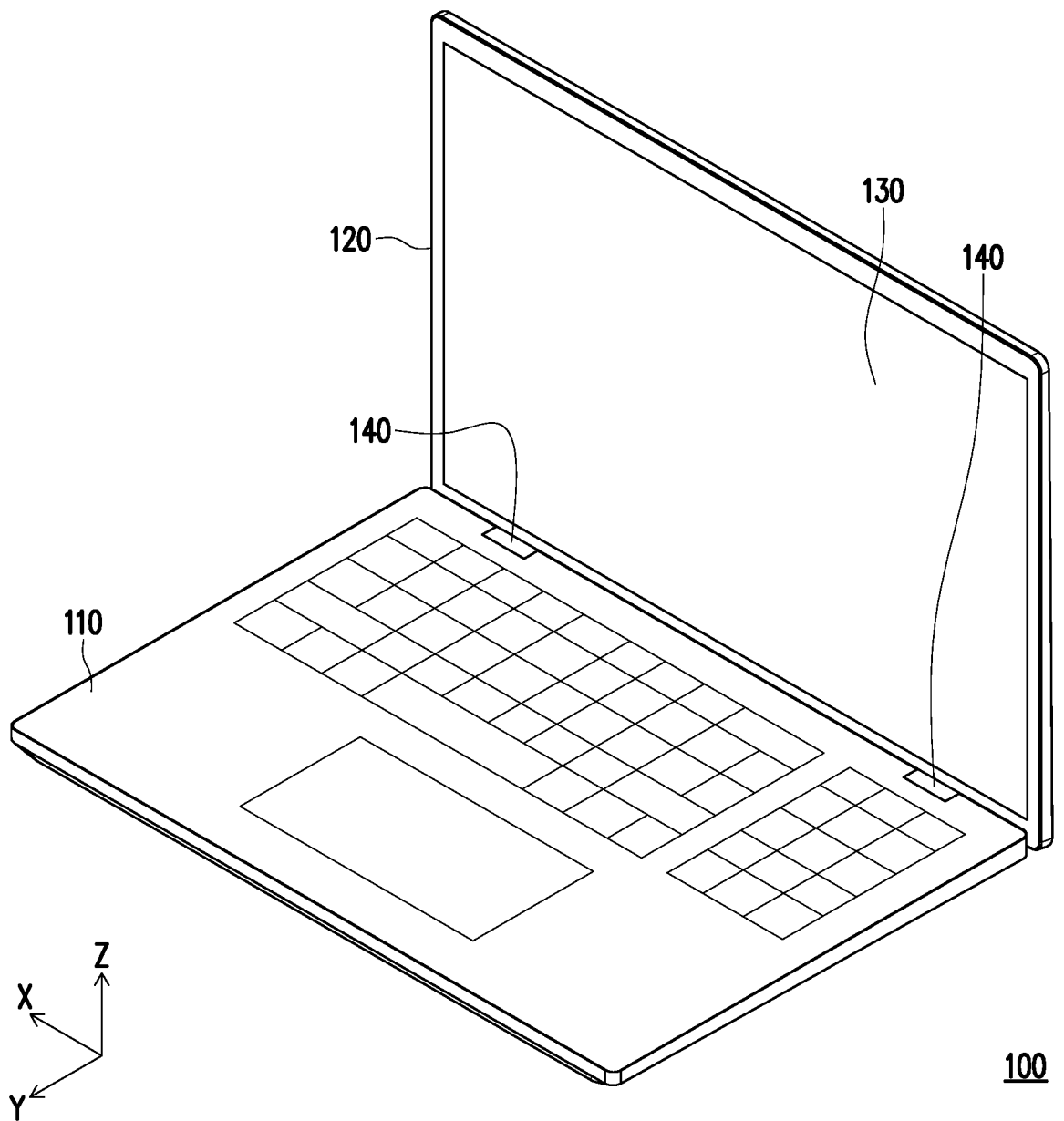
FIG. 1 is a schematic diagram of a laptop computer according to an embodiment of the present invention.
Figure 2:
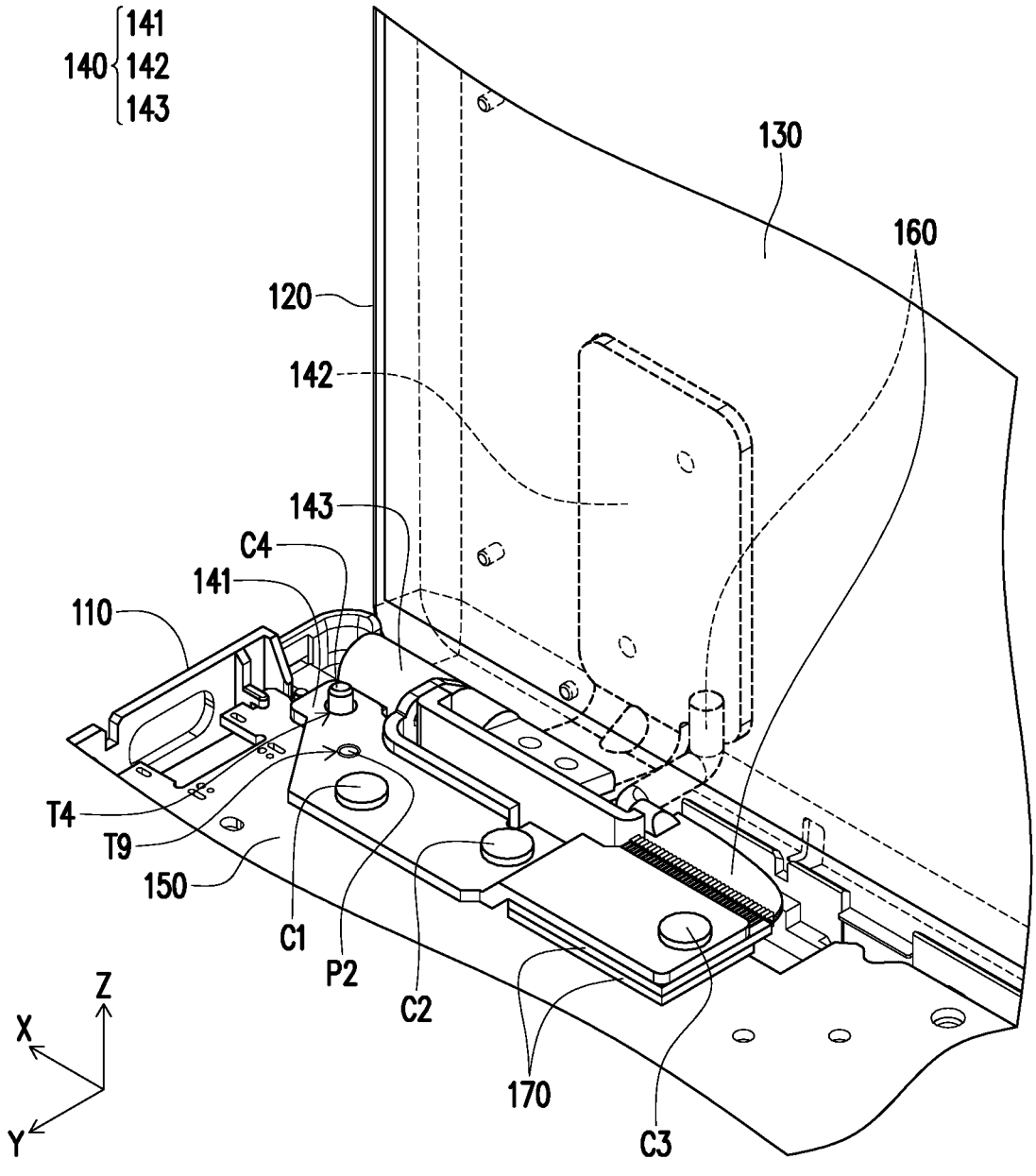
FIG. 2 is a schematic diagram of some components of the laptop computer in FIG. 1.

FIG. 1 is a schematic diagram of a laptop computer according to an embodiment of the present invention. FIG. 2 is a schematic diagram of some components of the laptop computer in FIG. 1. Here, the rectangular coordinates X-Y-Z are also provided to facilitate component description. Referring to FIG. 1 and FIG. 2 at the same time, in the embodiment, the laptop computer 100 includes a first body 110 (such as, a host), a circuit board 150 (such as, a motherboard), a second body 120, a display module 130, a hinge 140 and a mezzanine connector 170. The circuit board 150 is disposed in the first body 110, and the display module 130 is disposed in the second body 120. The hinge 140 is connected to the first body 110 and the second body 120, and the first body 110 and the second body 120 are pivoted to each other along the X-axis to be folded or unfolded via the hinge. The mezzanine connector 170 is clamped between the hinge 140 and the circuit board 150, and is electrically connected between the display module 130 and the circuit board 150. Here, the first body 110 is considered to be located on the X-Y plane.

Figure 3:
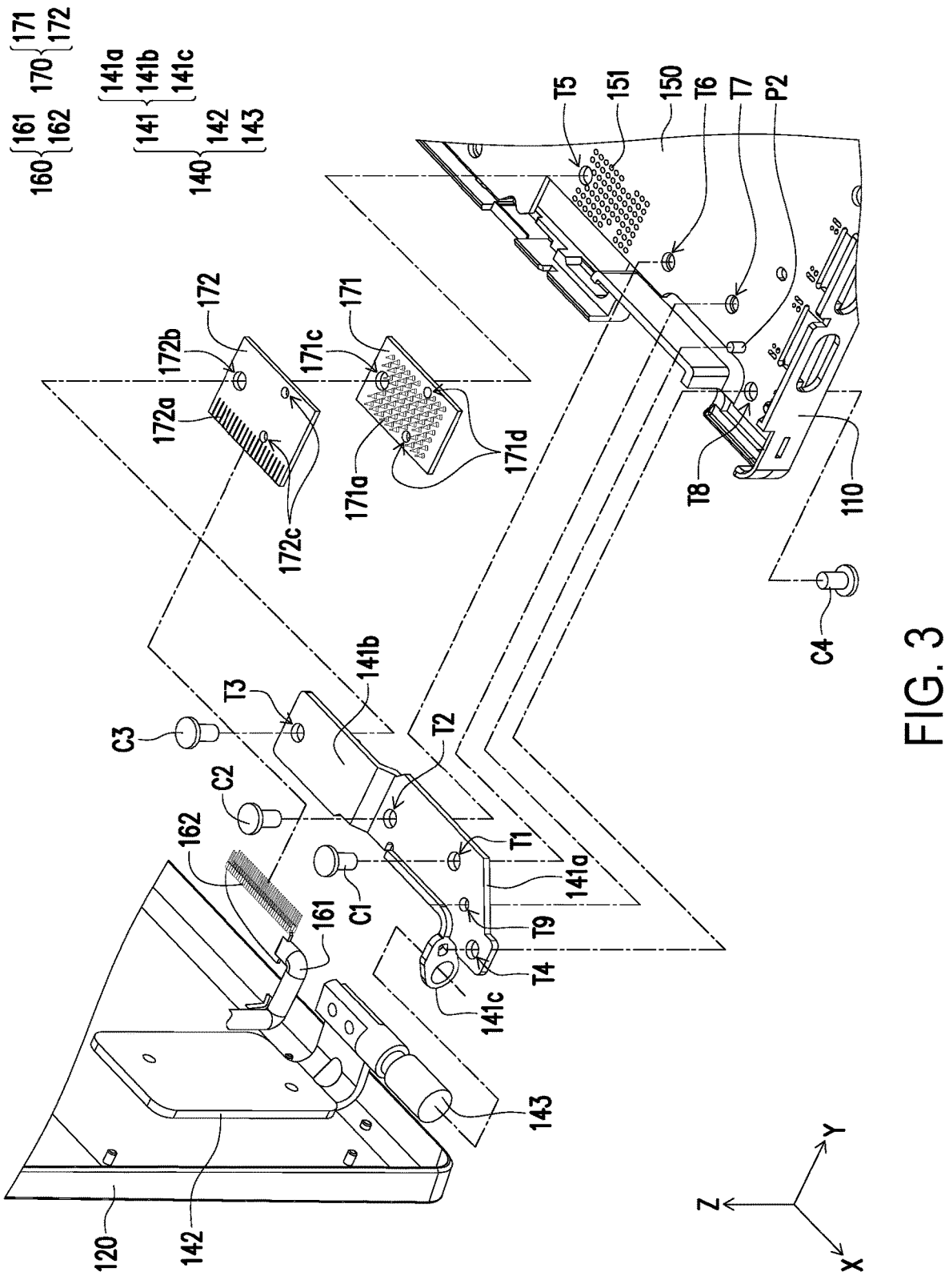
FIG. 3 is an exploded schematic diagram of some components of the laptop computer in FIG. 2.
Figure 4:
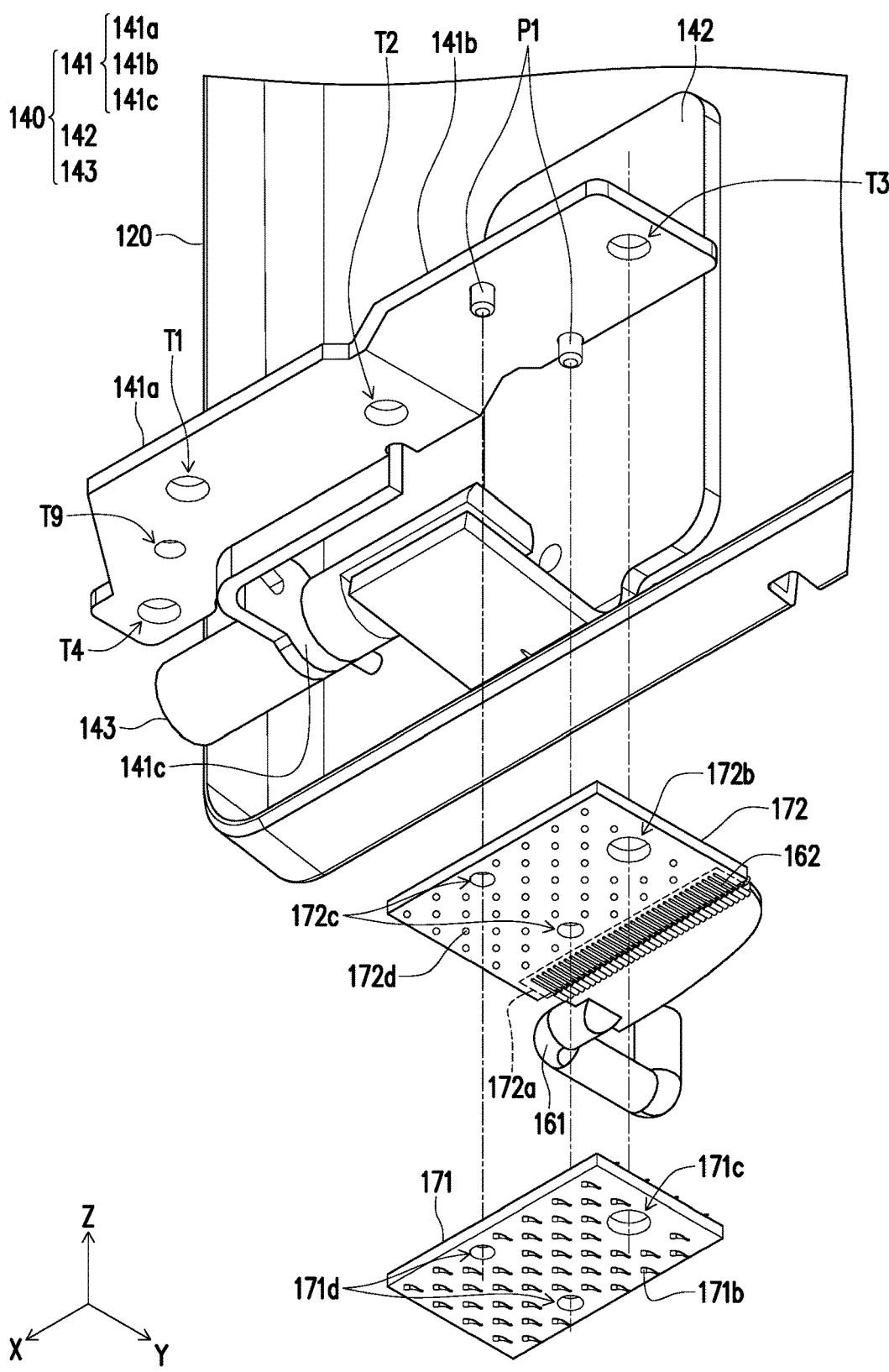
FIG. 4 shows the components of FIG. 3 from another perspective.

FIG. 3 is an exploded schematic diagram of some components of the laptop computer in FIG. 2. FIG. 4 shows the components of FIG. 3 from another perspective. Referring to FIG. 2 to FIG. 4 at the same time, in the embodiment, the hinge 140 includes a first bracket 141, a second bracket 142 and a rotating shaft 143, wherein the first bracket 141 is disposed in the first body 110, the second bracket 142 is disposed in the second body 120, and the rotating shaft 143 is connected to the second bracket 142 and pivoted to the first bracket 141. The mezzanine connector 170 is clamped between the first bracket 141 and the circuit board 150. Here, the first bracket 141 has a pivot joint 141*c*, a first plate body 141*a* and a second plate body 141*b*. The pivot joint 141*c* is pivoted to the rotating shaft 143. The first plate body 141*a* is connected between the pivot joint 141*c* and the second plate body 141*b*. The mezzanine connector 170 is clamped between the second plate body 141*b* and the circuit board 150 along the Z-axis.

As shown in FIG. 2 and FIG. 3, the mezzanine connector 170 includes a first sub-circuit board 171 and a second sub-circuit board 172. The first sub-circuit board 171 is stacked on the circuit board 150, and a first conductive array 171*b* of the first sub-circuit board 171 abuts and is electrically connected to a third conductive array 151 of the circuit board 150. The second sub-circuit board 172 is stacked on the first sub-circuit board 171 and is electrically connected to the display module 130. A portion of the hinge 140 is stacked on the second sub-circuit board 172, and a fourth conductive array 172*d* of the second sub-circuit board 172 abuts and is electrically connected to a second conductive array 171*a* of the first sub-circuit board 171. Here, the first conductive array 171*b* and the second conductive array 171*a* are shrapnel arrays respectively, and the third conductive array 151 and the fourth conductive array 172*d* are pad arrays respectively. In this way, the shrapnel arrays and the pad arrays can be smoothly connected to each other.

In the embodiment, the laptop computer 100 further includes a cable 160, which is electrically connected between the display module 130 and the circuit board 150. Furthermore, the cable 160 extends to and is electrically connected to a plurality of conductive pads 172*a* of the second sub-circuit board 172, and then is electrically connected to the circuit board 150 through the mezzanine connector 170. Here, the conductive pads 172*a* are distributed on the opposite surfaces of the second sub-circuit board 172, and the cable 160 includes a coaxial part 161 and a double row conductive sheets 162 extending from the coaxial part 161. The double row conductive sheets 162 are respectively electrically connected to the conductive pads 172*a* on the upper and lower surfaces of the second sub-circuit board 172, which are also in double rows.

Figure 5A:
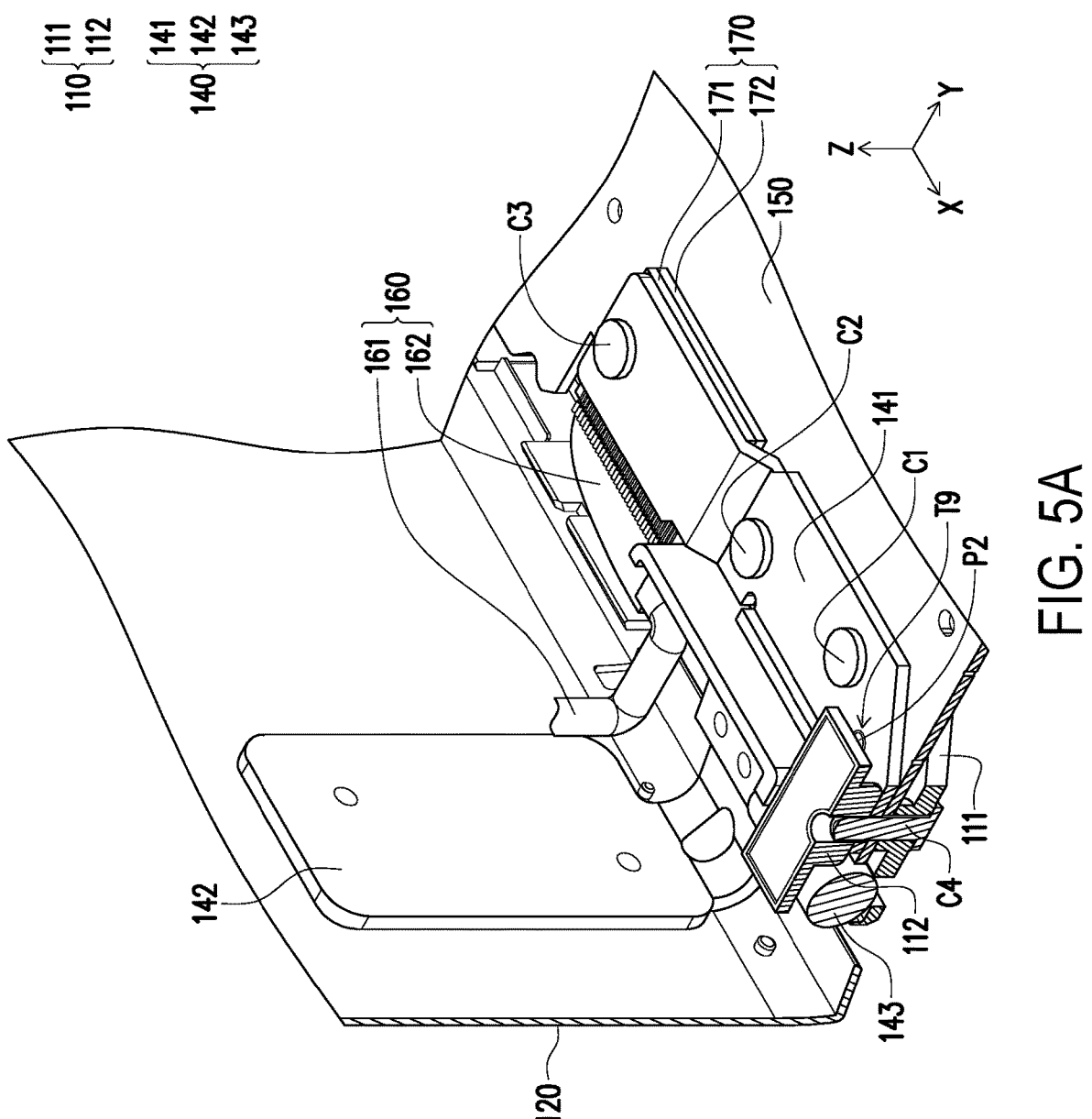
FIG. 5A to FIG. 5F are partial cross-sectional views of some components of the laptop computer at different positions.

FIG. 5A to FIG. 5F are partial cross-sectional views of some components of the laptop computer at different positions. Referring to FIG. 3 and FIG. 4 and comparing to FIG. 5A, in order to successfully achieve the assembly and combination effect, the laptop computer 100 of the embodiment further includes a plurality of lock attachments C1~C4 (such as, screws), as shown in FIG. 3 and FIG. 5A. The lock attachment C4 starts from the bottom of the first body 110 and performs the locking action. Here, the first body 110 is further divided into a component 111 and a component 112, which can be regarded as the upper shell (component 112) and the lower shell (component 111) of the first body 110. In order to facilitate identification, the components 111 and 112 are only partially shown. Accordingly, referring to FIG. 3 and FIG. 5A at the same time, the lock attachment C4 passes through the component 111, an opening T8 of the circuit board 150 and an opening T4 of the first plate body 141*a* of the first bracket 141 in sequence, and then locks into the component 112.

Figure 5B:
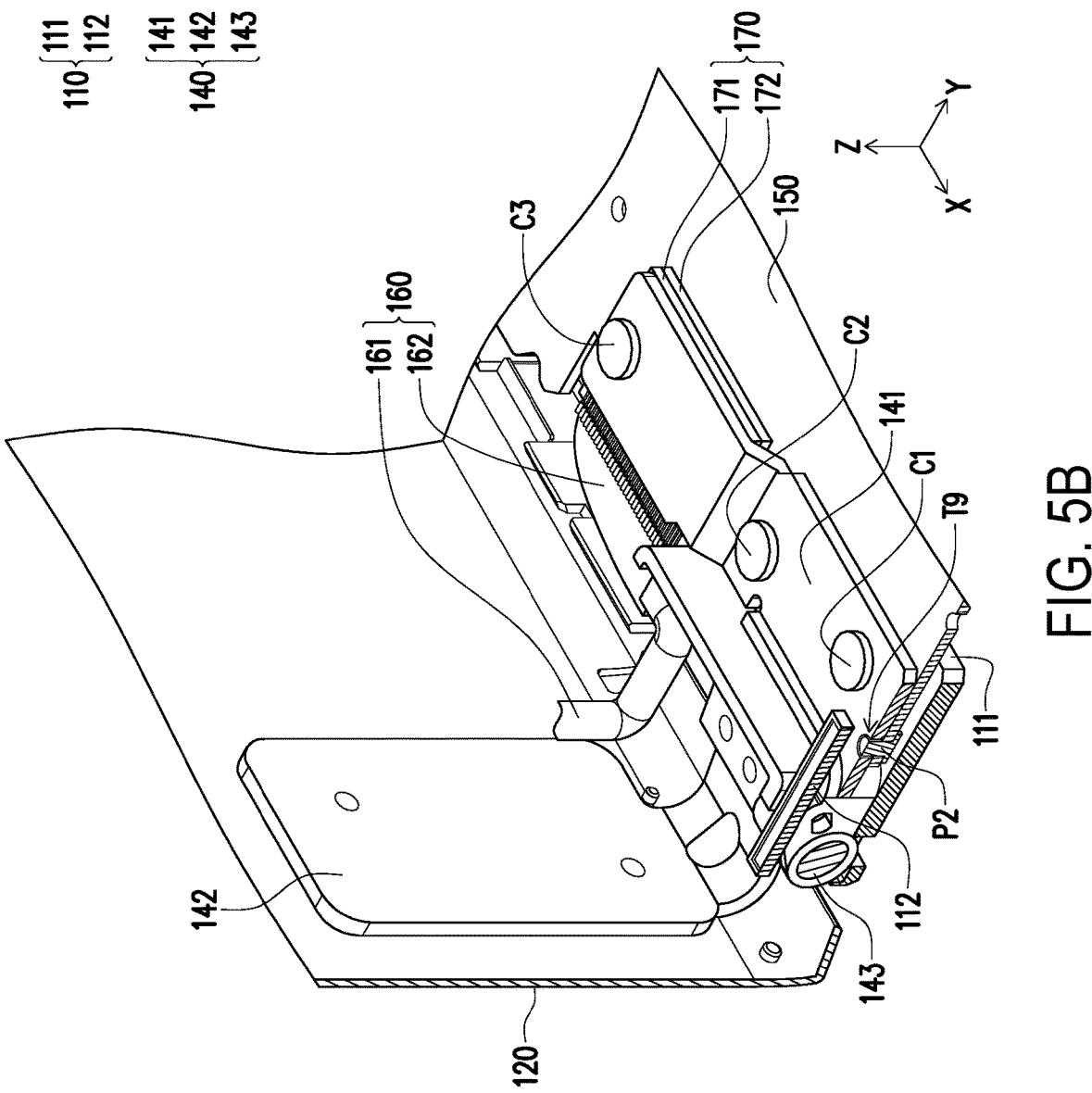

Then, referring to FIG. 3 and FIG. 4 and comparing with FIG. 5B, the laptop computer 100 of the embodiment also has a second positioning post P2, which protrudes upward from the circuit board 150 and passes through an opening T9 of the first plate body 141*a* of the first bracket 141 for positioning when assembling the hinge 140.

Figure 5C:
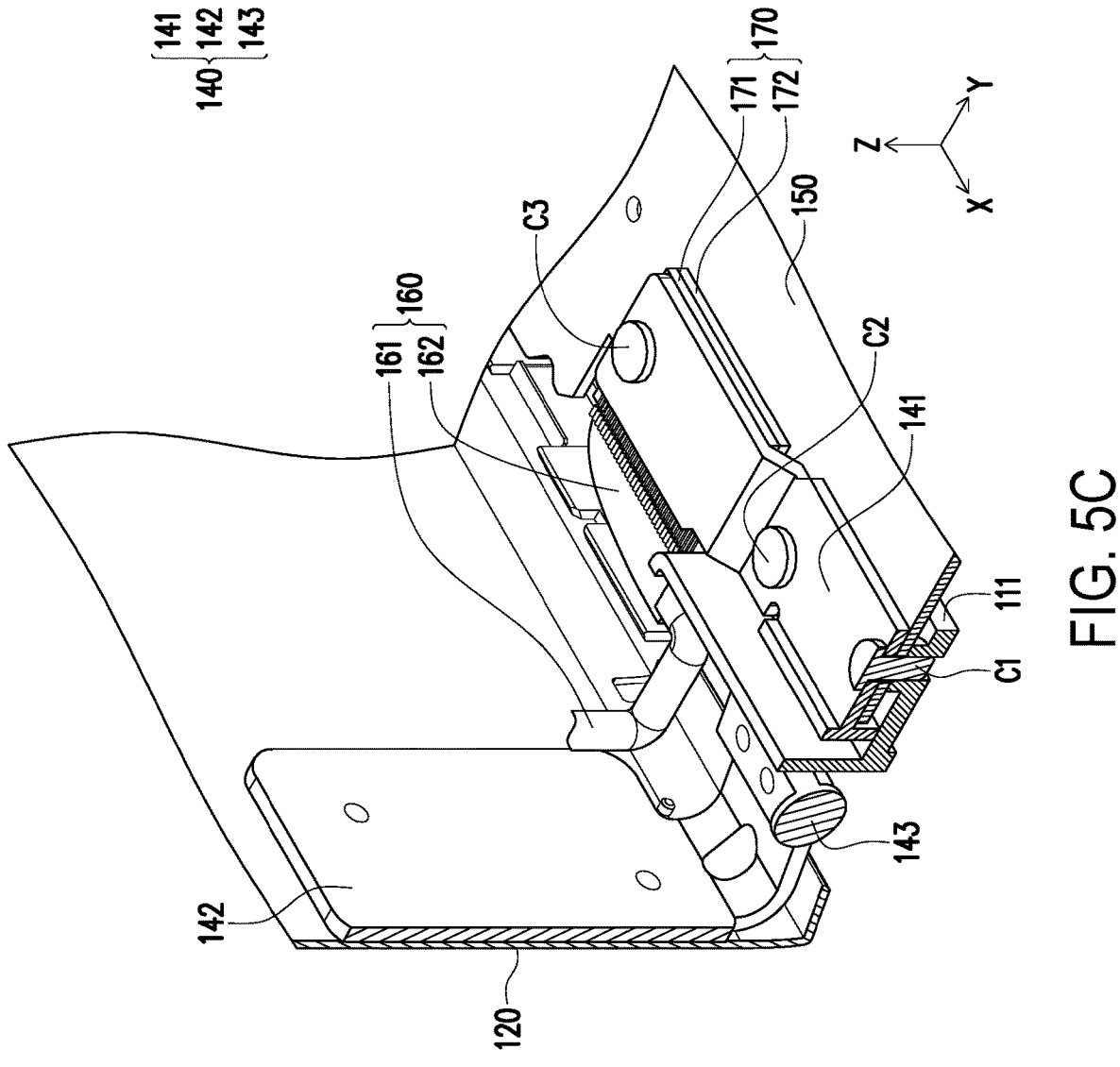

Then, referring to FIG. 3 and FIG. 4 and comparing with FIG. 5C, the lock attachment C1 starts from the hinge 140 and sequentially passes through an opening T1 of the first plate body 141*a* of the first bracket 141 and an opening T7 of the circuit board 150 to lock into the component 111 of the first body 110.

Figure 5D:
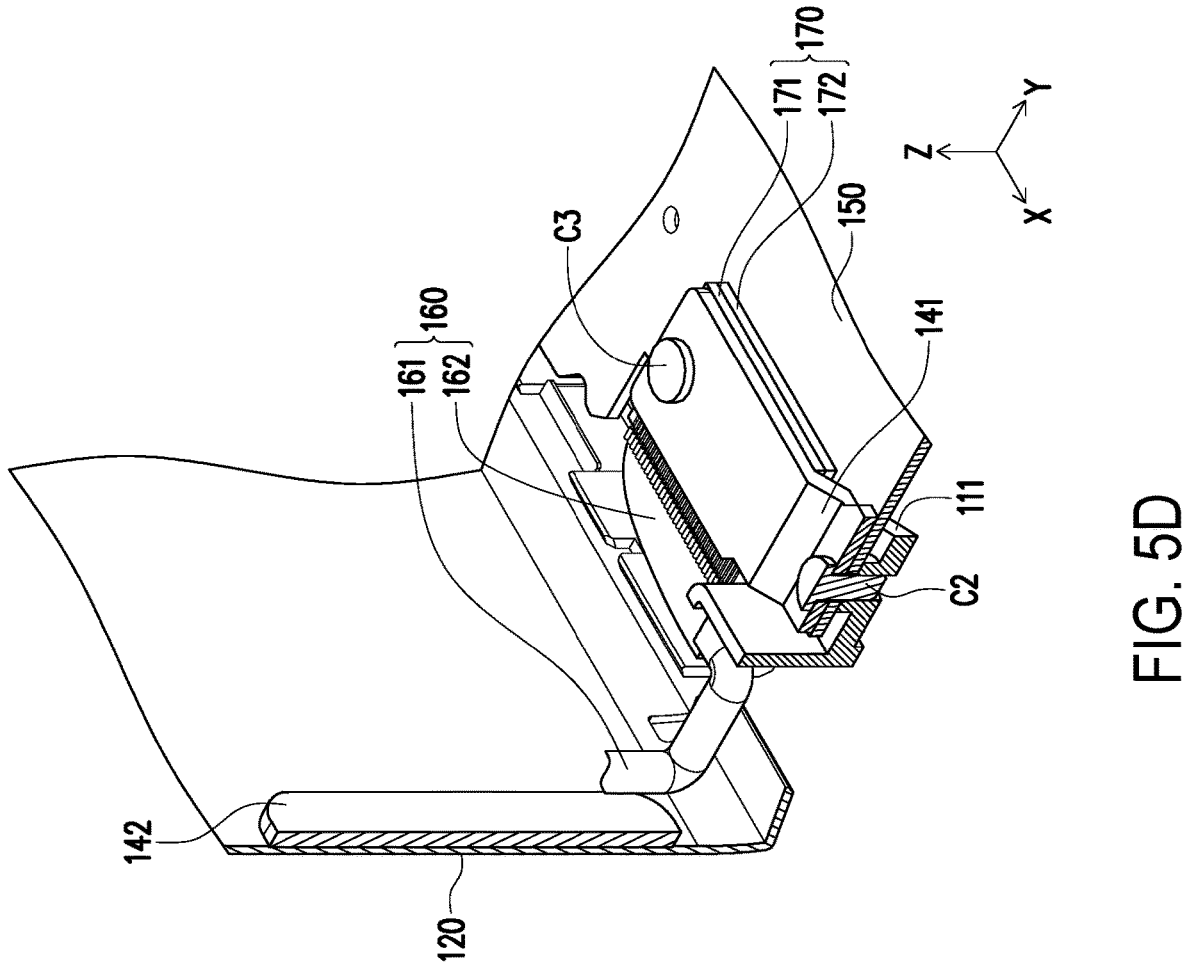

Then, referring to FIG. 3 and FIG. 4 and comparing with FIG. 5D, similar to the aforementioned lock attachment C1, the lock attachment C2 starts from the hinge 140 and sequentially passes through an opening T2 of the first plate body 141*a* of the first bracket 141 and an opening T6 of the circuit board 150 to lock into the component 111 of the first body 110.

Figure 5F:
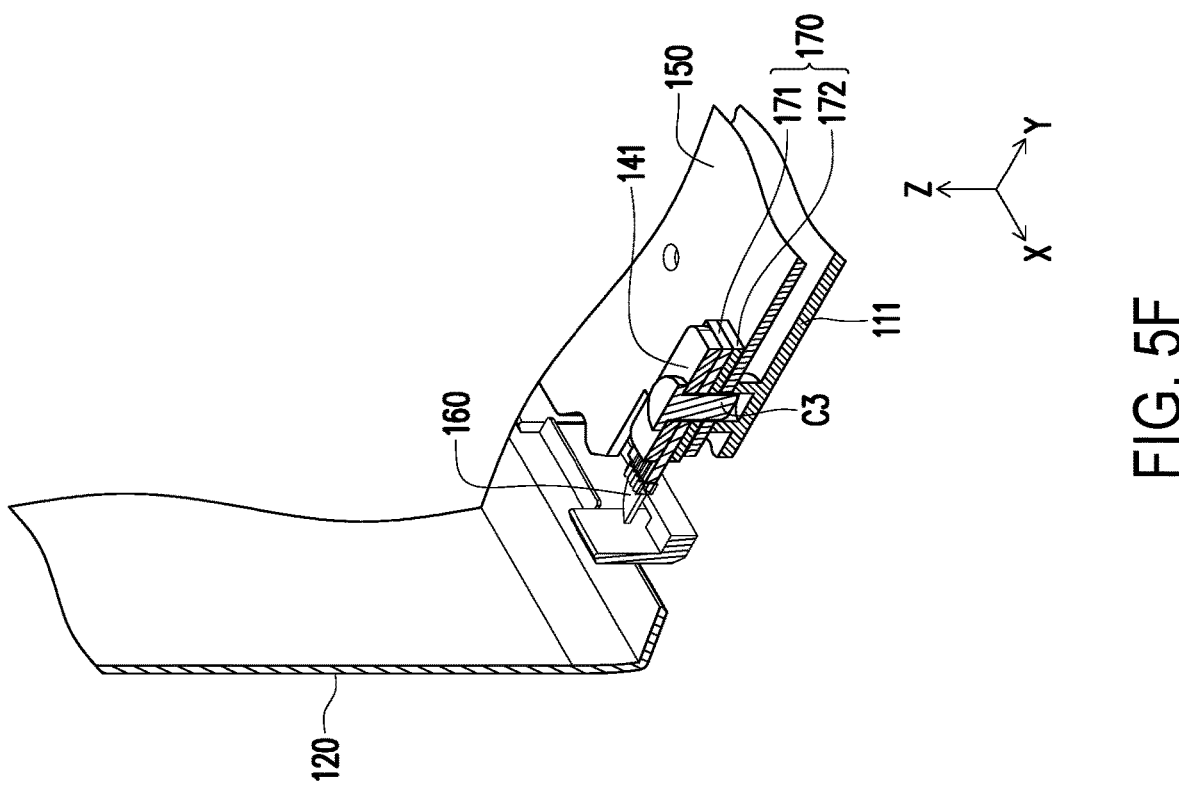
Figure 5E:
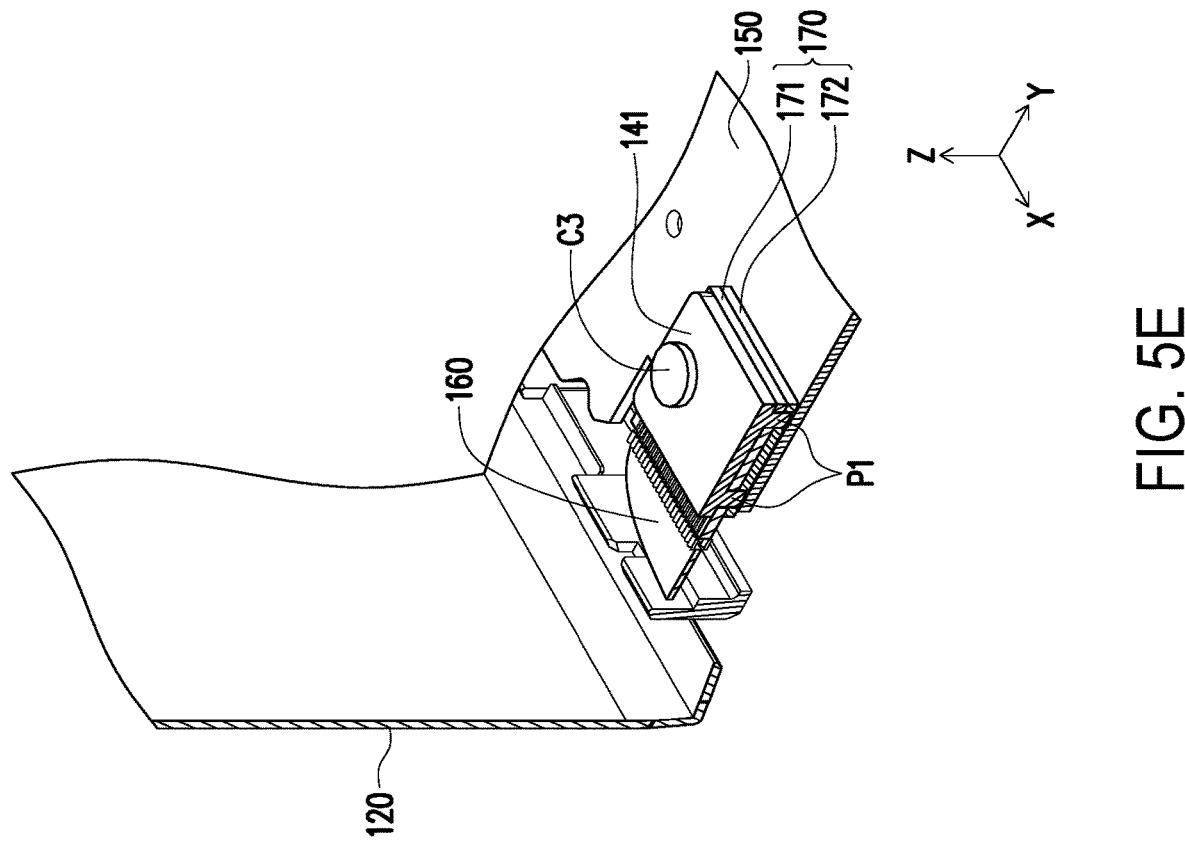

Then, referring to FIG. 3 and FIG. 4 and comparing with FIG. 5E, the hinge 140 of the embodiment also has a first positioning post P1, which is located on the bottom surface of the second plate body 141*b* of the first bracket 141, so as to pass through an opening 172*c* of the second sub-circuit board 172 and an opening 171*d* of the first sub-circuit board 171 in sequence. Thereby, the first sub-circuit board 171 and the second sub-circuit board 172 can be positioned together with the first bracket 141.

Then, referring to FIG. 3 and FIG. 4 and comparing with FIG. 5F, the lock attachment C3 starts from the hinge 140 and sequentially passes through an opening T3 of the second plate body 141*b* of the first bracket 141, an opening 172*b* of the second sub-circuit board 172, and opening 171*c* of the first sub-circuit board 171 and an opening T5 of the circuit board 150 to lock into the component 111 of the first body 110.

The first bracket 141 of the hinge 140, the mezzanine connector 170, the circuit board 150 and the first body 110 produce mutual positioning and locking combination effects through the lock attachments C1~C4 and the positioning posts P1, P2 of FIG. 5A to FIG. 5F. Also referring to FIG. 2 and FIG. 4, simply speaking, due to the stacking relationship of the above components, the cable 160 can be welded to the second sub-circuit board 172 of the mezzanine connector 170 after the second body 120 is assembled with the display module 130 and the second bracket 142 of the hinge 140. Then, during the process of assembling the second body 120 to the first body 110, the operator only needs to focus on the combination of components. That is to ensure that the second body 120, the hinge 140 and the mezzanine connector 170 respectively correspond to the positioning and locking of the first body 110 and the circuit board 150. When the assembly is completed, it is also equivalent to completing the connection operation of the display module 130 and the cable 160 being electrically connected to the circuit board 150 through the mezzanine connector 170.

In summary, in the above-described embodiment of the present invention, the laptop computer uses the corresponding settings of the hinge, the mezzanine connector and the circuit board in the body, so that when the display module and the hinge are assembled into the body with the circuit board (motherboard) built in, the mezzanine connector is clamped between the hinge and the circuit board. More importantly, the display module can be electrically connected to the circuit board through the mezzanine connector. In this way, the electrical connection can also be completed during the assembly of the aforementioned structure. For assembly operators, it can effectively simplify the assembly process and avoid the need to first arrange the wiring of electronic components (such as display modules) before plugging them in, thereby avoiding the occurrence of plugging errors.

Simply put, the overlapping relationship of the above-mentioned components allows operators in the assembly process to only focus on component assembly, and saves the need to spend additional time on operations such as wire management or connector plugging. Furthermore, the matching relationship between the above-mentioned components is beneficial to the disassembly and assembly operations. Therefore, for the laptop computer, users can easily complete subsequent expansion or repair without being limited by complicated assembly relationships, thereby improving the regeneration (repairability) ability of the laptop computer and meeting the conditions of sustainability.

What is claimed is:

1. A laptop computer comprising: a first body; a circuit board, disposed in the first body; a second body; a display module, disposed in the second body; a hinge, connected to the first and the second bodies, the first and the second bodies are pivoted to each other to be folded or unfolded via the hinge; and a mezzanine connector, clamped between the hinge and the circuit board and electrically connected between the display module and the circuit board, wherein the mezzanine connector comprises: a first sub-circuit board, stacked on the circuit board, a first conductive array of the first sub-circuit board abuts and is electrically connected to a third conductive array of the circuit board; and a second sub-circuit board, stacked on the first sub-circuit board and electrically connected to the display module, a portion of the hinge is stacked on the second sub-circuit board, a fourth conductive array of the second sub-circuit board abuts and is electrically connected to a second conductive array of the first sub-circuit board.

2. The laptop computer according to claim 1, wherein the hinge comprises:

a first bracket, disposed in the first body;
a second bracket, disposed in the second body; and
a rotating shaft, connected to the second bracket and pivoted to the first bracket, the mezzanine connector is clamped between the first bracket and the circuit board.

3. The laptop computer according to claim 2, wherein the first bracket has a pivot joint, a first plate body and a second plate body, the pivot joint is pivoted to the rotating shaft, the first plate body is connected between the pivot joint and the second plate body, the mezzanine connector is clamped between the second plate body and the circuit board.

4. The laptop computer according to claim 1, wherein the first conductive array and the second conductive array are shrapnel arrays respectively, the third conductive array and the fourth conductive array are pad arrays respectively.

5. The laptop computer according to claim 1, wherein the display module has a cable, extending to and electrically connected to a plurality of conductive pads of the second sub-circuit board.

6. The laptop computer according to claim 5, wherein the conductive pads are distributed on the opposite surfaces of the second sub-circuit board, and the cable comprises a coaxial part and double row conductive sheets extending from the coaxial part, the double row conductive sheets are electrically connected to the conductive pads respectively.

7. The laptop computer according to claim 1, wherein a portion of the hinge also has a plurality of first positioning posts, penetrating the mezzanine connector, so that the mezzanine connector and the portion are positioned together.

8. The laptop computer according to claim 1, further comprises at least one second positioning post, protruding from the circuit board and penetrating another portion of the hinge, so that the circuit board and the other portion are positioned together.

9. The laptop computer according to claim 1, further comprises a plurality of lock attachments, a part of the lock attachments lock the hinge, the mezzanine connector, the circuit board and the first body together, another part of the lock attachments lock the hinge, the circuit board and the first body together.

* * * * *